W. Y. FREE.
DUPLEX HAY PRESS.
APPLICATION FILED JUNE 29, 1912.
1,102,983.
Patented July 7, 1914.
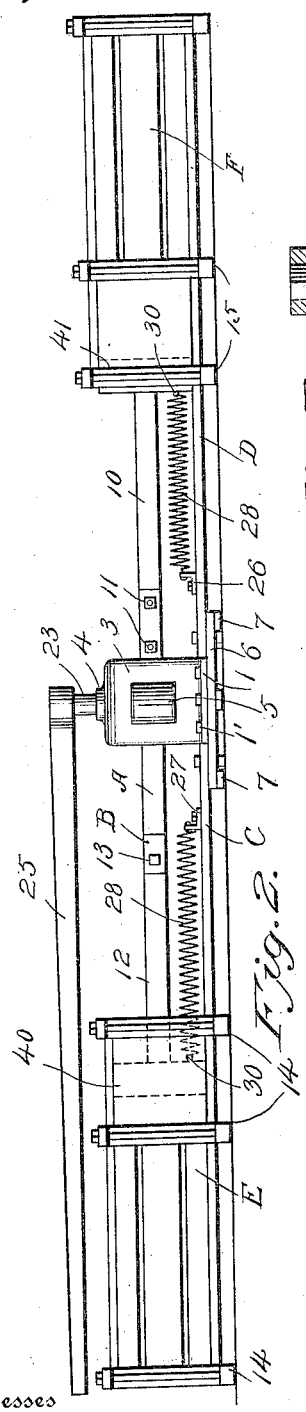
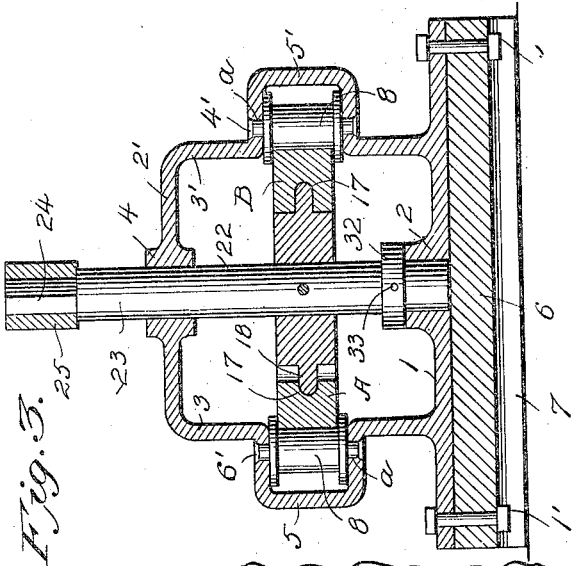
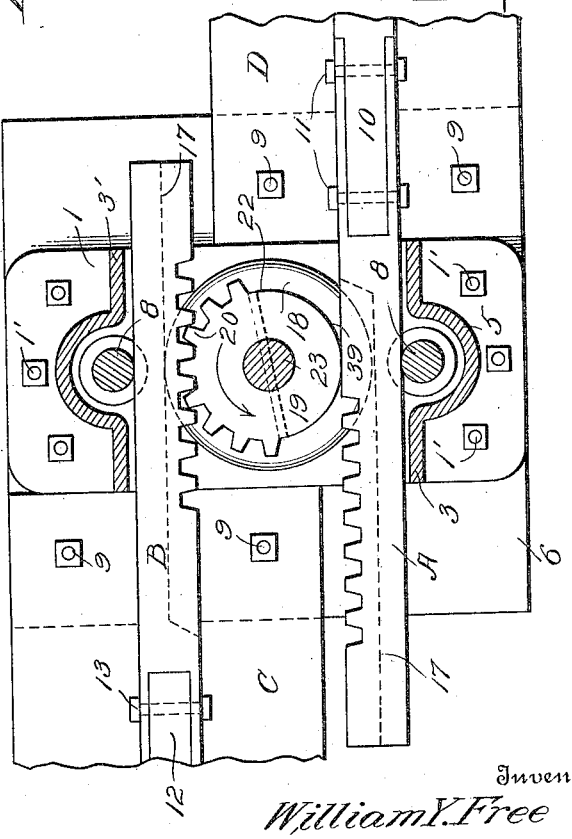
Witnesses
Inventor
William Y. Free
Attorney
THE NORRIS PETERS CO., PHOTO-LITHO., WASHINGTON, D. C.

UNITED STATES PATENT OFFICE.

WILLIAM Y. FREE, OF CARR, FLORIDA, ASSIGNOR OF ONE-HALF TO GEORGE F. TUCKER, OF BLOUNTSTOWN, FLORIDA.

DUPLEX HAY-PRESS.

1,102,983.  Specification of Letters Patent.  Patented July 7, 1914.

Application filed June 29, 1912. Serial No. 706,747.

*To all whom it may concern:*

Be it known that I, WILLIAM Y. FREE, a citizen of the United States, and a resident of Carr, in the county of Calhoun and State of Florida, have invented certain new and useful Improvements in Duplex Hay-Presses, of which the following is a specification, reference being had to the accompanying drawings.

This invention has relation to certain new and useful improvements in duplex presses of that kind employed in baling hay and the like and the object of my invention is to provide a press of this general character of a simple and inexpensive nature and of a durable construction which shall be capable of alternately reciprocating two plunger bars so that the power gear will be continuously in operation in compressing a bale.

Another object of my invention is to provide a duplex hay baler so constructed that the same can be conveniently converted into a single acting press.

With these and other objects in view the present invention consists in the combination and arrangement of parts as will be hereinafter more fully described and finally pointed out in the appended claims, it being further understood that changes in the specific structure shown and described may be made within the scope of the claims, without departing from the spirit of the invention.

In the accompanying drawings forming a part of this specification and in which like numerals of reference indicate similar parts in the several views: Figure 1 is a lengthwise elevational view of a duplex baling press embodying my invention. Fig. 2 shows a horizontal section through the working head. Fig. 3 shows a transverse vertical sectional view through the frame and segment gear.

In a baling press operated by a sweep actuated by draft animals there is a period of rest during which the driving shaft performs no work and during which period the operator fills the baling hopper. In my present invention I provide a duplex hay baler so constructed that when one plunger is at rest the opposite plunger is compressing though the baler if desired may be used as an ordinary single baler.

In carrying out the aim of my invention I employ a pallet 6 having the sills 7. To the pallet is secured what I term a working head including the base plate 1 having a centrally positioned bearing boss 2 as clearly shown in Fig. 3. Extending from this base 1 and preferably forming an integral part thereof, is an upstanding frame including the side members 3 and 3′ and the top member 2′ having the bearing 4 in alinement with the boss 2.

As shown in Figs. 1 and 2, the side portions 3 and 3′ of the frame have the two oppositely positioned outstanding bearing boxes 5 and 5′ located above said boss each bearing box having suitable bearing openings $a$ within which openings are held the pins 4′ and 6′. As shown in Fig. 3 each pin gives support to a flanged bearing roller 8. Revolubly held within the boss 2 and the bearing collar 4 is the power shaft 23 which below is provided with the collar 32 working upon the boss 2, this collar being secured by means of the pin 33. Fixed to this power shaft 23 is a segment gear including the head 19 having the gear teeth 20 and an active surface 39 being located between the end teeth. As clearly shown in Figs. 2 and 3 this segment gear is provided with a centrally positioned outstanding circumscribing flange 18 the flange extending a suitable distance beyond the gear segment, as shown in Fig. 2. This segment is secured to the power shaft by means of the pin 22. Secured to the base 6 are the two platforms C and D which extend in opposite directions each platform having a baling box, marked E and F respectively. Reciprocating within the baling boxes are the oppositely positioned plunger heads 40 and 41, indicated in dotted lines in Fig. 1, and extending from each plunger head is a plunger bar, the bars in the drawings being marked 12 and 10.

As clearly shown in Fig. 2 the end of the plunger bar 10 has secured to it a rack bar A, secured by means of the bolts 11 while the plunger bar 12 has secured to it the rack bar B secured by means of suitable bolts 13. These rack bars A and B further have a lengthwise running groove 17 indicated in dotted lines in Fig. 2 and engaging within these grooves 17 is the flange 18, this construction being clearly shown in Fig. 3. The rack bars A and B are of a width to accurately fit between the rollers 6 and 8 and the segment gear 19. These bars further are of a thickness so that they snugly fit between the roller flanges as shown in Fig. 3. From this it will be seen that the outer end of each plunger bar is carried by means of the segment gear flange 18 and the lower flanges of a roller 8. The peripheral edge 39 of the segment gear 19 is an active surface arranged to engage the inner face of the plunger bar at rest. In Fig. 2 the plunger bar B is shown as being reciprocated while the plunger bar A is at rest. In order to insure the plunger bars being drawn out of the baling boxes at the conclusion of the stroke, I provide each baling head with an ear 30 arranged to receive a spring 28, the springs having their forward ends secured to these ears 26 and 27 as shown in Fig. 1. The base plate 1 as shown in Fig. 2 is secured to the wooden pallet, 6 by means of the bolt 1' while the baling platforms E and D are secured to the pallet by means of the bolts 9 this construction being clearly shown in Fig. 2. When it is desired to use the baler as a single baler it is simply necessary to disconnect one of the plunger bars. It is of course understood that these baling presses may be made in various sizes.

A duplex baling press constructed in accordance with my invention is simple and inexpensive and both durable and efficient in operation.

Having thus described my said invention what I claim as new and desire to secure by U. S. Letters Patent is:—

1. In combination, a base plate having a centrally positioned bearing boss and an upstanding frame with a bearing in alinement with said boss, said frame having two oppositely positioned bearing boxes, a flanged bearing roller within each bearing box, a power shaft revolubly held within said boss and bearing, a segment gear secured to said shaft having a centrally positioned circumscribing outstanding flange, an active surface located between the end teeth of said gear, two oppositely positioned plunger heads, a rack bar secured to each plunger head each bar having a lengthwise running groove for co-action with said gear flange, said bars held upon the flanges of said bearing rollers, said active surface at times engaging said rack teeth, and springs to normally draw said rack bars in opposite directions.

2. In combination, a base plate having a centrally positioned bearing boss and an upstanding frame with a bearing in alinement with said boss, said frame having two oppositely positioned bearing boxes a flanged bearing roller within each bearing box, a power shaft revolubly held within said boss and bearing, a segment gear secured to said shaft having a centrally positioned circumscribing outstanding flange, an active surface located between the end teeth of said gear, two oppositely positioned plunger heads, a rack bar secured to each plunger head each bearing having a lengthwise running groove for co-acting with said gear flange, said bars held upon the flanges of said bearing rollers, said active surface at times engaging said rack teeth, springs to normally draw said rack bars in opposite directions, and a sweep secured to said power shaft.

In testimony whereof I affix my signature, in presence of two witnesses.

WILLIAM Y. FREE.

Witnesses:
 A. SCHULMAN,
 JOHN BAILEY, Jr.

---

Copies of this patent may be obtained for five cents each, by addressing the "Commissioner of Patents, Washington, D. C."